United States Patent
Liang

(10) Patent No.: US 10,435,302 B2
(45) Date of Patent: Oct. 8, 2019

(54) MANUFACTURING METHOD OF CARBON NANOTUBE CONDUCTIVE MICROSPHERES AND CONDUCTIVE GLUE

(71) Applicant: Shenzhen China Star Optoelectronics Technology Co., Ltd., Shenzhen (CN)

(72) Inventor: Yuheng Liang, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 13 days.

(21) Appl. No.: 15/542,656

(22) PCT Filed: Jun. 14, 2017

(86) PCT No.: PCT/CN2017/088194
§ 371 (c)(1),
(2) Date: Jul. 11, 2017

(87) PCT Pub. No.: WO2018/205340
PCT Pub. Date: Nov. 15, 2018

(65) Prior Publication Data
US 2018/0327267 A1  Nov. 15, 2018

(30) Foreign Application Priority Data
May 9, 2017  (CN) .......................... 2017 1 0322106

(51) Int. Cl.
*C01B 32/174* (2017.01)
*C08F 2/44* (2006.01)
(Continued)

(52) U.S. Cl.
CPC .............. *C01B 32/174* (2017.08); *C08F 2/14* (2013.01); *C08F 2/26* (2013.01); *C08F 2/44* (2013.01);
(Continued)

(58) Field of Classification Search
None
See application file for complete search history.

(56) References Cited

U.S. PATENT DOCUMENTS 7,153,903 B1 * 12/2006 Barraza .................. B82Y 30/00
524/847
2008/0131685 A1  6/2008 Lee et al.

FOREIGN PATENT DOCUMENTS

CN   101245120 A   8/2008
CN   101850242 A   10/2010
(Continued)

OTHER PUBLICATIONS

Qian et al, Applied Physics Letters, vol. 76, No. 20, pp. 2868-2870. (Year: 2000).*

*Primary Examiner* — William D Young
(74) *Attorney, Agent, or Firm* — Leong C. Lei

(57) ABSTRACT

A manufacturing method of carbon nanotube conductive microspheres, which can simplify the process, reduce the process, save cost, and reduce the impact of thermal mismatching, to ensure the conductive properties of conductive microspheres, and not pollute the environment. The carbon nanotubes are mixed in the polymer microspheres when the styrene monomer, the crosslinking agent and the initiator have a crosslinking reaction to form the polymer microspheres with a method of spray-granulation. Only one step is needed to prepare the conductive microspheres with carbon nanotube as the conductive medium, which can simplify the process, reduce the process, save cost. With mixing the carbon nanotube inside the polymer microspheres, the thermal mismatching between the carbon nanotubes and the resin can be illuminated, to ensure the conductive properties of conductive microspheres. Furthermore, (Continued)

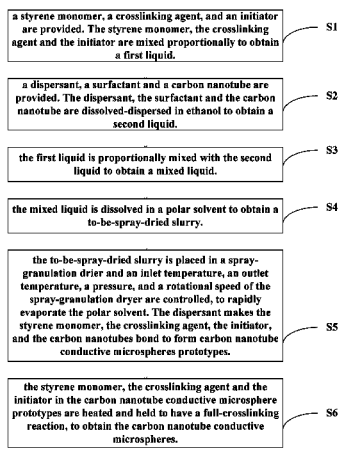

the entire preparing process has no heavy metal salts; the bio-toxicity is reduced and no environmental pollution.

16 Claims, 1 Drawing Sheet

(51) Int. Cl.
| | |
|---|---|
| C08F 2/14 | (2006.01) |
| C08L 29/04 | (2006.01) |
| C08K 3/04 | (2006.01) |
| C08K 5/14 | (2006.01) |
| C08K 5/23 | (2006.01) |
| C08K 5/42 | (2006.01) |
| C08K 5/5425 | (2006.01) |
| C08K 3/30 | (2006.01) |
| C08J 3/12 | (2006.01) |
| C09J 9/02 | (2006.01) |
| H01B 1/24 | (2006.01) |
| C08F 12/08 | (2006.01) |
| C08F 212/08 | (2006.01) |
| C08F 212/36 | (2006.01) |
| C08F 292/00 | (2006.01) |
| C09J 11/04 | (2006.01) |
| C08F 2/26 | (2006.01) |
| B82Y 30/00 | (2011.01) |
| B82Y 40/00 | (2011.01) |
| C08K 9/10 | (2006.01) |

(52) U.S. Cl.
CPC ............ *C08F 12/08* (2013.01); *C08F 212/08* (2013.01); *C08F 212/36* (2013.01); *C08F 292/00* (2013.01); *C08J 3/122* (2013.01); *C08K 3/041* (2017.05); *C08K 3/30* (2013.01); *C08K 5/14* (2013.01); *C08K 5/23* (2013.01); *C08K 5/42* (2013.01); *C08K 5/5425* (2013.01); *C08L 29/04* (2013.01); *C09J 9/02* (2013.01); *C09J 11/04* (2013.01); *H01B 1/24* (2013.01); *B82Y 30/00* (2013.01); *B82Y 40/00* (2013.01); *C01B 2202/22* (2013.01); *C08F 2500/24* (2013.01); *C08K 9/10* (2013.01); *C08K 2003/3054* (2013.01); *C08K 2201/001* (2013.01); *C08K 2201/011* (2013.01)

(56) References Cited

FOREIGN PATENT DOCUMENTS

| CN | 105060268 A | 11/2015 |
|---|---|---|
| CN | 105199641 A | 12/2015 |
| CN | 105585728 A | 5/2016 |
| CN | 106520008 A | 3/2017 |

* cited by examiner

```
┌─────────────────────────────────────────────────┐
│ a styrene monomer, a crosslinking agent, and an initiator │
│ are provided. The styrene monomer, the crosslinking        │──── S1
│ agent and the initiator are mixed proportionally to obtain │
│                    a first liquid.                         │
└─────────────────────────────────────────────────┘
                          │
┌─────────────────────────────────────────────────┐
│ a dispersant, a surfactant and a carbon nanotube are       │
│ provided. The dispersant, the surfactant and the carbon    │──── S2
│ nanotube are dissolved-dispersed in ethanol to obtain a    │
│                    second liquid.                          │
└─────────────────────────────────────────────────┘
                          │
┌─────────────────────────────────────────────────┐
│ the first liquid is proportionally mixed with the second   │──── S3
│           liquid to obtain a mixed liquid.                 │
└─────────────────────────────────────────────────┘
                          │
┌─────────────────────────────────────────────────┐
│ the mixed liquid is dissolved in a polar solvent to obtain a │── S4
│              to-be-spray-dried slurry.                     │
└─────────────────────────────────────────────────┘
                          │
┌─────────────────────────────────────────────────┐
│    the to-be-spray-dried slurry is placed in a spray-      │
│   granulation drier and an inlet temperature, an outlet    │
│    temperature, a pressure, and a rotational speed of the  │
│      spray-granulation dryer are controlled, to rapidly    │
│    evaporate the polar solvent. The dispersant makes the   │
│     styrene monomer, the crosslinking agent, the initiator,│──── S5
│   and the carbon nanotubes bond to form carbon nanotube    │
│           conductive microspheres prototypes.              │
└─────────────────────────────────────────────────┘
                          │
┌─────────────────────────────────────────────────┐
│      the styrene monomer, the crosslinking agent and the   │
│    initiator in the carbon nanotube conductive microsphere │
│    prototypes are heated and held to have a full-crosslinking│── S6
│        reaction, to obtain the carbon nanotube conductive  │
│                       microspheres.                        │
└─────────────────────────────────────────────────┘
```

MANUFACTURING METHOD OF CARBON NANOTUBE CONDUCTIVE MICROSPHERES AND CONDUCTIVE GLUE

BACKGROUND OF THE INVENTION

Field of Invention

The present invention relates to the field of liquid crystal display, and more particularly to a manufacturing method of carbon nanotube conductive microspheres and conductive glue.

Description of Prior Art

At present, the thin film transistor liquid crystal displays (TFT-LCD) mostly apply a sealant doped with conductive gold balls to conduct the upper and lower substrates, forming a one-way conductive path. When the upper and lower substrates are bonded, the metal wrapped in the outer layer of the conductive gold balls can transmit electrons for conduction, and the inner core of the conductive gold balls is elastic resin or plastic, which can generate deformation, to eliminate the pressure after the upper and lower substrates are bonded.

In the conventional art, the manufacturing method of the conductive gold ball applied to the TFT-LCD sealant or the anisotropic conductive film (ACF) sealant are generally prepared by polymerizing or thermally curing, to form plastic or resin balls as cue balls, and then coating the conductive metal on the surface of the plastic or resin microspheres to form a conductive layer. There are several shortcomings in this type of manufacturing method:

(1) First, prepare plastic or resin microspheres, then plate conductive metal, which is usually called as "two-step method" in this field. The method involves the preparation of microspheres and the control of particle diameters and the electroplating deposition process of conductive metals. This process is more cumbersome and complex.

(2) The plastic or resin microsphere materials are the polymer, which has a large heat shrinkage difference with respect to the conductive metal layer. It is easy to generate thermal stress in the preparation process, leading to thermal mismatching between the conductive metal layer and microspheres' surface, and causing the conductive metal layer peeling off and affecting the conductive properties of the conductive gold balls.

(3) Generally, the conductive metals are gold (Cu), Silver (Ag), aluminum (Al), copper (Cu), nickel (Ni), etc., Cu, Al, Ni are cheap with good conductivity but easy to oxidize. Ag has good conductivity an chemical stability but easy to occur the phenomenon of electronic migration in wet environment; as for Au, the metal salts used in the plating process are mostly cyanide with extremely high toxicity, and heavy metal pollution is easy to occur during the plating process, furthermore, Au is rare-precious metal and the cost is very high.

With the development of display technology, there is a conductive ball with carbon nanotube (CNT) as the conductive medium. The preparation method of conductive microspheres using CNT coated resin microspheres is described in patent No. CN 201510662918.7. The method is still a "two-step method", and the process is complicated.

SUMMARY OF THE INVENTION

The object of the present invention is to provide a manufacturing method of carbon nanotube conductive microspheres, which can simplify the process, reduce the process, save cost, and reduce the impact of thermal mismatching, to ensure the conductive properties of conductive microspheres, and not pollute the environment.

The another object of the present invention is to provide a conductive glue, the carbon nanotube conductive microspheres therein are easy to manufacture, lower cost, lower impact of thermal mismatching, great conductive properties, and no environmental pollution.

In order to achieve the objective, the present invention provides a manufacturing method of carbon nanotube conductive microspheres, which comprises following steps:

Step S1, a styrene monomer, a crosslinking agent, and an initiator are provided. The styrene monomer, the crosslinking agent and the initiator are mixed proportionally to obtain a first liquid.

Step S2, a dispersant, a surfactant and a carbon nanotube are provided. The dispersant, the surfactant and the carbon nanotube are dissolved-dispersed in ethanol to obtain a second liquid.

Step S3, the first liquid is proportionally mixed with the second liquid to obtain a mixed liquid.

Step S4, the mixed liquid is dissolved in a polar solvent to obtain a to-be-spray-dried slurry.

Step S5, the to-be-spray-dried slurry is placed in a spray-granulation drier and an inlet temperature, an outlet temperature, a pressure, and a rotational speed of the spray-granulation dryer are controlled, to rapidly evaporate the polar solvent. The dispersant makes the styrene monomer, the crosslinking agent, the initiator, and the carbon nanotubes bond to form carbon nanotube conductive microspheres prototypes.

Step S6, the styrene monomer, the crosslinking agent and the initiator in the carbon nanotube conductive microsphere prototypes are heated and held to have a full-crosslinking reaction, to obtain the carbon nanotube conductive microspheres.

In the step S1, weight percentages of the styrene monomer, the crosslinking agent and the initiator are: 60%≤the styrene monomer≤90%, 10%≤the crosslinking agent≤40% and the initiator≤5%.

The crosslinking agent is at least one selected from divinylbenzene, peroxide crosslinking agent and silane crosslinking agent.

The initiator is at least one selected from sodium bisulfite, ammonium persulfate, potassium persulfate, dibenzoyl peroxide, tert-Butyl peroxybenzoate and azobisisobutyronitrile.

The peroxide crosslinking agent is at least one selected from dicumyl peroxide, benzoyl peroxide, di-t-butyl peroxide and dicumyl peroxide.

The silane-based crosslinking agent is a mixture of one or both of vinyltriethoxysilane and vinyltriethoxysilane.

In the step S2, weight percentages of the dispersant, the surfactant and the carbon nanotube are: the dispersant≤10%, the surfactant≤10% and 80%≤the carbon nanotubes≤100%.

The dispersant is polyvinyl alcohol.

The surfactant is at least one selected from cetyltrimethylammonium bromide, sodium dodecyl sulfate, sodium lauryl sulfate, and sodium dodecylbenzenesulfonate.

In the step S3, a volume ratio of the first liquid to the second liquid is: 10:1 to 1:10.

In the step S4, the polar solvent is ethanol.

A volume ratio of the mixed liquid to the polar solvent is: 1:10 to 10:1.

A viscosity of the to-be-spray-dried slurry is: 0.1 cp to 50 cp.

The viscosity of the to-be-spray-dried slurry is less than 10 cp.

In the step S5, the inlet temperature of the spray-granulation dryer is 150° C. to 500° C., the outlet temperature of the spray-granulation dryer is 0° C. to 200° C. and the rotational speed of the spray-granulation dryer is 50 rpm to 150 rpm.

In the step S6, the temperature after heated is 75° C. to 85° C., and a time for holding is 4 h to 5 h.

The present invention further provides conductive glue, which comprises the carbon nanotube conductive microspheres manufactured by the manufacturing method of carbon nanotube conductive microspheres as above mentioned.

The present invention further provides a manufacturing method of carbon nanotube conductive microspheres, which comprises following steps:

Step S1, a styrene monomer, a crosslinking agent and an initiator are provided. The styrene monomer, the crosslinking agent and the initiator are mixed proportionally to obtain a first liquid.

Step S2, a dispersant, a surfactant and a carbon nanotube are provided. The dispersant, the surfactant and the carbon nanotube are dissolved-dispersed in ethanol to obtain a second liquid.

Step S3, the first liquid is proportionally mixed with the second liquid to obtain a mixed liquid.

Step S4, the mixed liquid is dissolved in a polar solvent to obtain a to-be-spray-dried slurry.

Step S5, the to-be-spray-dried slurry is placed in a spray-granulation drier, and an inlet temperature, an outlet temperature, a pressure, and a rotational speed of the spray-granulation dryer are controlled, to rapidly evaporate the polar solvent. The dispersant makes the styrene monomer, the crosslinking agent, the initiator, and the carbon nanotubes bond to form carbon nanotube conductive microspheres prototypes.

Step S6, the styrene monomer, the crosslinking agent and the initiator in the carbon nanotube conductive microsphere prototypes are heated and held to have a full-crosslinking reaction, to obtain the carbon nanotube conductive microspheres.

In the step S1, weight percentages of the styrene monomer, the crosslinking agent and the initiator are: 60%≤the styrene monomer≤90%, 10%≤the crosslinking agent≤40% and the initiator≤5%.

The crosslinking agent is at least one selected from divinylbenzene, peroxide crosslinking agent and silane crosslinking agent.

The initiator is at least one selected from sodium bisulfite, ammonium persulfate, potassium persulfate, dibenzoyl peroxide, tert-Butyl peroxybenzoate and azobisisobutyronitrile.

In the step S2, weight percentages of the dispersant, the surfactant and the carbon nanotube are: the dispersant≤10%, the surfactant≤10% and 80%≤the carbon nanotubes≤100%.

The beneficial advantages of the present invention are: in comparison with a manufacturing method of carbon nanotube conductive microspheres provided by the present invention provides and the conventional "two-step method" which needs to prepare the plastic or resin microspheres and then plating the conductive metal, it is not necessary to respectively prepare the plastic or resin microspheres and the conductive layer, instead, the carbon nanotube are mixed in the polymer microspheres when the styrene monomer, the crosslinking agent and the initiator have a crosslinking reaction to form the polymer microspheres with a method of spray-granulation. Only one step is needed to prepare the conductive microspheres with carbon nanotube as the conductive medium, which can simplify the process, reduce the process, save cost. With mixing the carbon nanotube inside the polymer microspheres, the thermal mismatching between the carbon nanotubes and the resin can be illuminated, to ensure the conductive properties of conductive microspheres. Furthermore, the entire preparing process has no heavy metal salts; the bio-toxicity is reduced and no environmental pollution. The present invention provides a conductive glue, which comprises the carbon nanotube conductive microspheres manufactured by the manufacturing method of carbon nanotube conductive microspheres are easy to manufacture, lower cost, lower impact of thermal mismatching, great conductive properties, and no environmental pollution.

BRIEF DESCRIPTION OF THE DRAWINGS

For better understanding the technical proposals and other beneficial effects of the present invention, please refer the following detailed description of the present invention with the accompanying drawings.

In drawings:

FIG. 1 is a flow diagram of a manufacturing method of carbon nanotube conductive microspheres according to the present invention.

DETAILED DESCRIPTION OF THE PREFERRED EMBODIMENTS

The technical proposals and the effects of the present invention will be described in further detail with reference to the below preferred embodiments of the present invention and their accompanying drawings.

Please refer to FIG. 1, the present invention is to provide a manufacturing method of carbon nanotube conductive microspheres, which comprises following steps:

Step S1, a styrene monomer, a crosslinking agent and an initiator are provided. The styrene monomer, the crosslinking agent and the initiator are mixed proportionally to obtain a first liquid.

Specifically, weight percentages of the styrene monomer, the crosslinking agent and the initiator are: 60%≤the styrene monomer≤90%, 10%≤the crosslinking agent≤40% and the initiator≤5%.

The crosslinking agent is at least one selected from divinylbenzene (DVB), peroxide crosslinking agent and silane crosslinking agent. Furthermore, the peroxide crosslinking agent is at least one selected from dicumyl peroxide (DCP), benzoyl peroxide (BPO), di-t-butyl peroxide (DTBP) and dicumyl peroxide (DBHP); the silane-based crosslinking agent is a mixture of one or both of vinyltriethoxysilane (Such as A1522 of the Union Carbide Corporation, USA) and vinyltriethoxysilane (Such as A151 of the Union Carbide Corporation, USA).

The initiator is at least one selected from sodium bisulfite ($NaHso_3$), ammonium persulfate (($NH_4$)$_2S_2O_8$), potassium persulfate ($K_2S_2O_8$), dibenzoyl peroxide (BPO), tert-Butyl peroxybenzoate (BPB) and azobisisobutyronitrile (AIBN).

Step S2, a dispersant, a surfactant and a carbon nanotube are provided. The dispersant, the surfactant and the carbon nanotube are dissolved-dispersed in ethanol to obtain a second liquid.

Step S3, the first liquid is proportionally mixed with the second liquid to obtain a mixed liquid.

Specifically, a volume ratio of the first liquid to the second liquid is: 10:1 to 1:10. With this ratio, the ratio of the polystyrene resin microspheres and the carbon nanotubes formed in the subsequent steps is adjusted, to regulate the mechanical properties and electrical properties of the finally obtained carbon nanotube conductive microspheres.

Weight percentages of the dispersant, the surfactant and the carbon nanotube are: the dispersant≤10%, the surfactant≤10% and 80%≤the carbon nanotubes≤100%.

Furthermore, the dispersant is polyvinyl alcohol (PVA); the surfactant is at least one selected from cetyltrimethylammonium bromide (CTAB), sodium dodecyl sulfate (SDS), sodium lauryl sulfate (SLS), and sodium dodecylbenzenesulfonate (SDBS).

Step S4, the mixed liquid is dissolved in a polar solvent to obtain a to-be-spray-dried slurry.

Specifically, a volume ratio of the mixed liquid to the polar solvent is: 1:10 to 10:1, the viscosity of the to-be-spray-dried slurry is adjusted by this ratio so that the viscosity of the to-be-spray-dried slurry is 0.1 cp to 50 cp. Preferably, the viscosity of the to-be-spray-dried slurry is less than 10 cp.

Step S5, the to-be-spray-dried slurry is placed in a spray-granulation drier, and the inlet temperature of the spray-granulation dryer is controlled within 150° C. to 500° C., the outlet temperature of the spray-granulation dryer is controlled within 0° C. to 200° C., the rotational speed of the spray-granulation dryer is controlled within 50 rpm to 150 rpm and the pressure is controlled, to rapidly evaporate the 90% polar solvent within 20 seconds, then the slurry is preliminary dried, the dispersant makes the styrene monomer, the crosslinking agent, the initiator, and the carbon nanotubes bond to form carbon nanotube conductive microspheres prototypes.

In the step S5, the spray granulation is performed with the spray-granulation drier, and the to-be-spray-dried slurry is sprayed into the granulation tower of the spray-granulation dryer. With the action of spraying hot air, the to-be-spray-dried slurry is dried and agglomerated, to derive spherical aggregates, which are the carbon nanotube conductive microspheres prototypes. Furthermore, inside the carbon nanotube conductive microspheres prototypes, styrene monomer, crosslinking agent, initiator and carbon nanotube are mixed with each other.

The advantage of using a spray-granulation dryer is that the drying speed is fast and the size and size distribution of carbon nanotube conductive microspheres and etc. can be regulated by adjusting the viscosity of the to-be-spray-dried slurry and, the inlet temperature, the outlet temperature, the turntable speed, the pressure of the spray-granulation dryer, and the fan speed, the adjusting performance of the process is better.

Step S6, the styrene monomer, the crosslinking agent and the initiator in the carbon nanotube conductive microsphere prototypes are heated to 75° C. to 85° C. and held for 4 h to 5 h, to have a full-crosslinking reaction, to obtain the carbon nanotube conductive microspheres, and to improve the cohesion and mechanical strength of carbon nanotube conductive microspheres.

The above method can be called "one step method", for the method allows the styrene monomer, the crosslinking agent, and the initiator to undergo crosslinking reaction to form the polymer microspheres while the carbon nanotubes are doped in the polymer microspheres rather than the two-step method as in the conventional art (first preparation of plastic or resin microspheres and then plating conductive metal). The method can simplify the process, reduce the process, save cost; the carbon nanotubes has conductive function as the conductive medium, the polymer microspheres has supporting function to generate deformation while under heat-pressure, for the carbon nanotubes are doped in the polymer microspheres, the effect of thermal mismatching between the carbon nanotubes and the resin can be illuminated, to ensure the conductive properties of conductive microsphere; additionally, the entire preparing process has no heavy metal salts, the bio-toxicity is reduced and no environmental pollution.

Based on the same inventive concept, the present invention further provides conductive glue, which comprises a gum and carbon nanotube conductive microspheres dispersed within the gum. The gum can be selected as ACF conductive gum. The carbon nanotube conductive microspheres manufactured by the above method, in other words, the nanotubes are doped within the polymer microspheres, the polymer microspheres are easy to manufacture, lower cost, lower impact of thermal mismatching, great conductive properties, and no environmental pollution.

As mentioned above, in comparison with a manufacturing method of carbon nanotube conductive microspheres provided by the present invention provides and the conventional "two-step method" which needs to prepare the plastic or resin microspheres and then plating the conductive metal, it is not necessary to respectively prepare the plastic or resin microspheres and the conductive layer, instead, the carbon nanotube are mixed in the polymer microspheres when the styrene monomer, the crosslinking agent and the initiator have a crosslinking reaction to form the polymer microspheres with a method of spray-granulation. Only one step is needed to prepare the conductive microspheres with carbon nanotube as the conductive medium, which can simplify the process, reduce the process, save cost. With mixing the carbon nanotube inside the polymer microspheres, the thermal mismatching between the carbon nanotubes and the resin can be illuminated, to ensure the conductive properties of conductive microspheres. Furthermore, the entire preparing process has no heavy metal salts; the bio-toxicity is reduced and no environmental pollution. The present invention provides a conductive glue, which comprises the carbon nanotube conductive microspheres manufactured by the manufacturing method of carbon nanotube conductive microspheres are easy to manufacture, lower cost, lower impact of thermal mismatching, great conductive properties, and no environmental pollution.

As mentioned above, those of ordinary skill in the art, without departing from the spirit and scope of the present invention, can make various kinds of modifications and variations to the present invention. Therefore, all such modifications and variations are intended to be included in the protection scope of the appended claims of the present invention.

What is claimed is:

1. A manufacturing method of carbon nanotube conductive microspheres, comprising following steps:
   step S1, providing a styrene monomer, a crosslinking agent, and an initiator, proportionally mixing the styrene monomer, the crosslinking agent and the initiator to obtain a first liquid;
   step S2, providing a dispersant, a surfactant and a carbon nanotube, dissolving-dispersing the dispersant, the surfactant and the carbon nanotube in ethanol to obtain a second liquid;
   step S3, proportionally mixing the first liquid with the second liquid to obtain a mixed liquid;
   step S4, dissolving the mixed liquid in a polar solvent to obtain a to-be-spray-dried slurry;
   step S5, placing the to-be-spray-dried slurry in a spray-granulation drier, and controlling an inlet temperature, an outlet temperature, a pressure, and a rotational speed of the spray-granulation dryer, to rapidly evaporate the polar solvent, the dispersant makes the styrene monomer, the crosslinking agent, the initiator, and the carbon nanotubes bond to form carbon nanotube conductive microspheres prototypes;

step S6, heating and holding the styrene monomer, the crosslinking agent and the initiator in the carbon nanotube conductive microsphere prototypes to have a full-crosslinking reaction, and to obtain the carbon nanotube conductive microspheres.

2. The manufacturing method of carbon nanotube conductive microspheres according to claim 1, wherein in the step S1, weight percentages of the styrene monomer, the crosslinking agent and the initiator are: 60%≤the styrene monomer≤90%, 10%≤the crosslinking agent≤40% and the initiator≤5%;

the crosslinking agent is at least one selected from divinylbenzene, peroxide crosslinking agent and silane crosslinking agent;

the initiator is at least one selected from sodium bisulfite, ammonium persulfate, potassium persulfate, dibenzoyl peroxide, tert-Butyl peroxybenzoate and azobisisobutyronitrile.

3. The manufacturing method of carbon nanotube conductive microspheres according to claim 2, wherein the peroxide crosslinking agent is at least one selected from dicumyl peroxide, benzoyl peroxide, di-t-butyl peroxide and dicumyl peroxide;

the silane crosslinking agent is a mixture of one or both of vinyltriethoxysilane and vinyltriethoxysilane.

4. The manufacturing method of carbon nanotube conductive microspheres according to claim 1, wherein in the step S2, weight percentages of the dispersant, the surfactant and the carbon nanotube are: the dispersant≤10%, the surfactant≤10% and 80%≤the carbon nanotubes≤100%.

5. The manufacturing method of carbon nanotube conductive microspheres according to claim 4, wherein the dispersant is polyvinyl alcohol;

the surfactant is at least one selected from cetyltrimethylammonium bromide, sodium dodecyl sulfate, sodium lauryl sulfate, and sodium dodecylbenzenesulfonate.

6. The manufacturing method of carbon nanotube conductive microspheres according to claim 1, wherein in the step S3, a volume ratio of the first liquid to the second liquid is: 10:1 to 1:10.

7. The manufacturing method of carbon nanotube conductive microspheres according to claim 1, wherein in the step S4, the polar solvent is ethanol;

a volume ratio of the mixed liquid to the polar solvent is: 1:10 to 10:1;

a viscosity of the to-be-spray-dried slurry is: 0.1 cp to 50 cp.

8. The manufacturing method of carbon nanotube conductive microspheres according to claim 7, the viscosity of the to-be-spray-dried slurry is in the range of 0.1-10 cp.

9. The manufacturing method of carbon nanotube conductive microspheres according to claim 1, wherein in the step S5, the inlet temperature of the spray-granulation dryer is 150° C. to 500° C., the outlet temperature of the spray-granulation dryer is 0° C. to 200° C. and the rotational speed of the spray-granulation dryer is 50 rpm to 150 rpm;

in the step S6, the temperature after heated is 75° C. to 85° C., and a time for holding is 4 h to 5 h.

10. A manufacturing method of carbon nanotube conductive microspheres, comprising following steps:

step S1, providing a styrene monomer, a crosslinking agent, and an initiator, proportionally mixing the styrene monomer, the crosslinking agent and the initiator to obtain a first liquid;

step S2, providing a dispersant, a surfactant and a carbon nanotube, dissolving-dispersing the dispersant, the surfactant and the carbon nanotube in ethanol to obtain a second liquid;

step S3, proportionally mixing the first liquid with the second liquid to obtain a mixed liquid;

step S4, dissolving the mixed liquid in a polar solvent to obtain a to-be-spray-dried slurry;

step S5, placing the to-be-spray-dried slurry in a spray-granulation drier, and controlling an inlet temperature, an outlet temperature, a pressure, and a rotational speed of the spray-granulation dryer, to rapidly evaporate the polar solvent, the dispersant makes the styrene monomer, the crosslinking agent, the initiator, and the carbon nanotubes bond to form carbon nanotube conductive microspheres prototypes;

step S6, heating and holding the styrene monomer, the crosslinking agent and the initiator in the carbon nanotube conductive microsphere prototypes to have a full-crosslinking reaction, and to obtain the carbon nanotube conductive microspheres;

wherein in the step S1, weight percentages of the styrene monomer, the crosslinking agent and the initiator is: 60%≤the styrene monomer≤90%, 10%≤the crosslinking agent≤40% and the initiator≤5%;

the crosslinking agent is at least one selected from divinylbenzene, peroxide crosslinking agent and silane crosslinking agent;

the initiator is at least one selected from sodium bisulfite, ammonium persulfate, potassium persulfate, dibenzoyl peroxide, tert-Butyl peroxybenzoate and azobisisobutyronitrile;

wherein in the step S2, weight percentages of the dispersant, the surfactant and the carbon nanotube are: the dispersant≤10%, the surfactant≤10% and 80%≤the carbon nanotubes≤100%.

11. The manufacturing method of carbon nanotube conductive microspheres according to claim 10, wherein the peroxide crosslinking agent is at least one selected from dicumyl peroxide, benzoyl peroxide, di-t-butyl peroxide and dicumyl peroxide;

the silane crosslinking agent is a mixture of one or both of vinyltriethoxysilane and vinyltriethoxysilane.

12. The manufacturing method of carbon nanotube conductive microspheres according to claim 10, wherein the dispersant is polyvinyl alcohol;

the surfactant is at least one selected from cetyltrimethylammonium bromide, sodium dodecyl sulfate, sodium lauryl sulfate, and sodium dodecylbenzenesulfonate.

13. The manufacturing method of carbon nanotube conductive microspheres according to claim 10, wherein in the step S3, a volume ratio of the first liquid to the second liquid is: 10:1 to 1:10.

14. The manufacturing method of carbon nanotube conductive microspheres according to claim 10, wherein in the step S4, the polar solvent is ethanol;

a volume ratio of the mixed liquid to the polar solvent is: 1:10 to 10:1;

a viscosity of the to-be-spray-dried slurry is: 0.1 cp to 50 cp.

15. The manufacturing method of carbon nanotube conductive microspheres according to claim 14, the viscosity of the to-be-spray-dried slurry is in the range of 0.1-10 cp.

16. The manufacturing method of carbon nanotube conductive microspheres according to claim 10, wherein in the step S5, the inlet temperature of the spray-granulation dryer is 150° C. to 500° C., the outlet temperature of the spray-granulation dryer is 0° C. to 200° C. and the rotational speed of the spray-granulation dryer is 50 rpm to 150 rpm;

in the step S6, the temperature after heated is 75° C. to 85° C., and a time for holding is 4 h to 5 h.

* * * * *